(12) United States Patent
Szamocki

(10) Patent No.: US 12,525,356 B2
(45) Date of Patent: Jan. 13, 2026

(54) MACHINE LEARNING RECOMMENDER SYSTEM FOR EDUCATIONAL CLINICAL CONTENT

(71) Applicant: BBLHD Ltd, Harlow (GB)

(72) Inventor: Sonia Szamocki, Harlow (GB)

(73) Assignee: BBLHD Ltd (GB)

( * ) Notice: Subject to any disclaimer, the term of this patent is extended or adjusted under 35 U.S.C. 154(b) by 0 days.

(21) Appl. No.: 18/523,857

(22) Filed: Nov. 29, 2023

(65) Prior Publication Data

US 2024/0177859 A1    May 30, 2024

Related U.S. Application Data

(60) Provisional application No. 63/385,533, filed on Nov. 30, 2022.

(51) Int. Cl.
*G16H 50/20* (2018.01)
*G06F 40/40* (2020.01)
*G16H 10/60* (2018.01)

(52) U.S. Cl.
CPC ............ *G16H 50/20* (2018.01); *G06F 40/40* (2020.01); *G16H 10/60* (2018.01)

(58) Field of Classification Search
CPC ............................. G16H 50/20; G16H 10/60
See application file for complete search history.

(56) References Cited

U.S. PATENT DOCUMENTS

| | | | |
|---|---|---|---|
| 2021/0228276 A1* | 7/2021 | Giraldez | G09B 1/00 |
| 2022/0028529 A1* | 1/2022 | Paull | G16H 50/20 |
| 2022/0093220 A1* | 3/2022 | Feuerstein | G16H 15/00 |
| 2022/0300832 A1* | 9/2022 | Gnanasambandam | G16H 10/60 |

* cited by examiner

*Primary Examiner* — Jay M. Patel

(57) ABSTRACT

A machine learning educational content recommender system that provides educational clinical content is disclosed. An educational content recommender system may receive input about a specific case and about a specific clinician. Using this data, the educational content recommender system may recommend educational clinical content for the specific clinician to use for a specific case. Feedback from the specific clinician may be used to train the educational content recommender system. This feedback may include either or both explicit and implicit feedback items.

14 Claims, 12 Drawing Sheets

MACHINE LEARNING RECOMMENDER SYSTEM FOR EDUCATIONAL CLINICAL CONTENT

BACKGROUND

Continued clinician training can be difficult to predict and manage. Often the longer a clinician is in practice the further the clinician is removed from training or education. This can result in decreased patient care. General training can help but may not provide actionable intelligence that can be used day to day to provide treatment to specific patients with specific needs and may not fill the information gap between what the clinician knows and what is available or possible.

SUMMARY

A machine learning system and method for training a neural network is disclosed that trains a neural network to rank and provide ranked educational clinical content to a clinician based on information about the clinician, the patient, the procedure, etc.

A machine learning system and method selecting content is disclosed that selects educational clinical content from a set of educational clinical content based on information about the clinician, the patient, the procedure, etc.

A method is disclosed that includes storing a plurality of educational clinical content items in a database, each of the plurality of educational clinical content items used by a clinician to provide a clinical treatment to a patient; receiving patient information about a specific patient; receiving clinician information about a specific clinician; inputting the patient information and the clinician information into a natural language processor to produce one or more keywords; inputting the one or more keywords into a machine learning system that selects an educational clinical content item from the plurality of educational clinical content items based on the one or more keywords; and/or outputting the educational clinical content item to a user through a user interface.

The method may further include receiving clinical feedback through a user interface regarding the usefulness of the outputted educational clinical content item; and/or training the machine learning system based on the clinical feedback.

The clinical feedback, for example, may include the amount of time the user viewed the selected educational clinical content. The clinical feedback, for example, may include the number of times the user viewed the selected educational clinical content.

A machine learning system is disclosed that includes a storage medium storing a plurality of educational clinical content items in a database, each of the plurality of educational clinical content items used by a clinician to provide a clinical treatment to a patient; and a processor electrically coupled with the storage medium. The processor receives patient information about a specific patient; receives clinician information about a specific clinician; executes a natural language function that inputs the patient information and the clinician information and produces one or more keywords; executes a machine learning function that selects an educational clinical content item from the plurality of educational clinical content items stored in the storage medium based on the one or more keywords from the one or more keywords; and/or outputs the educational clinical content item to a user through a user interface.

The processor may further include receive clinical feedback through a user interface regarding the usefulness of the outputted educational clinical content item; and/or train the machine learning system based on the clinical feedback.

The clinical feedback, for example, may include the amount of time the user viewed the selected educational clinical content. The clinical feedback, for example, may include the number of times the user viewed the selected educational clinical content.

The machine learning system, for example, may select a portion of an educational clinical content item from the plurality of educational clinical content items based on the one or more keywords.

The patient information, for example, may include clinical patient information and non-clinical patient information.

The patient information, for example, may include patient age, patient sex, data files about the patient, patient requirements, clinician assessments of the patient, clinician preferences, extra-oral photographs, intra-oral photographs, 3D image files, radiographic images, patient motivations, patient concerns, treatment discussions, treatment timing, intervention preferences, patient name, patient sex, patient age, patient date of birth, prior dental treatment, prior dental treatment, prior orthodontics treatment details, prior facial aesthetics, prior facial aesthetics, patient fitness, patient dental fitness, patient occupation, patient dietary factors, patient drug history, patient smoking history, patient alcohol history, and/or patient teeth grinding history.

The patient info, for example, may include patient information comprises one or more items selected from the group consisting of upper dental center-line in relation to the midline of the face, lower dental center-line in relation to the upper dental center-line, lower dental center-line in relation to the midpoint of the chin, amount of crowding in the upper arch, an amount of crowding in the lower arch, the amount of overjet, incisor relationship, amount of overbite, amount of open bite, molar relationship, the teeth in a crossbite, caries risk, perio risk, tooth surface loss, oral health pathology, dental pathology, oral hygiene, BPE, and/or gingival biotype.

The one or more keywords, for example, may include a nonclinical keyword and a clinical keyword.

The educational clinical content items, for example, may include instructional videos, instructional presentations, and instructional articles.

A computer-implemented machine learning method is disclosed. The computer-implemented method may include storing a set of educational clinical content in a database, the set of educational clinical content comprising a plurality of educational clinical content; receiving a set of patient information; receiving a set of clinician information; receiving keyword data from a clinical expert for at least a portion of the plurality of educational clinical content in the content database; training the neural network in a first stage using the keyword data, the set of patient information, and the set of clinician information; receiving patient information and clinician information through a user interface; outputting educational clinical content from the set of educational clinical content that is ranked as the most useful educational clinical content of the set of educational clinical content based on the patient information and clinician information using the neural network; receiving user feedback through the user interface regarding the usefulness of the specific educational clinical content; and training the neural network in a second stage using the keyword data, the set of patient information, the set of clinician information, the patient information, the second patient information and the user feedback. The user feedback, for example, may include implicit feedback and/or explicit feedback.

A computer-implemented machine learning method is disclosed. The computer-implemented method may include storing a set of educational clinical content in a database, the set of educational clinical content comprising a plurality of educational clinical content; receiving a set of patient information; receiving a set of clinician information; receiving ranking data from a dental expert through a user interface ranking the usefulness of each item of educational clinical content in the set of educational clinical content for a given combination of patient information and clinician information; training the neural network in a first stage using the ranking data, the set of patient information, and the set of clinician information; receiving patient information and clinician information through a user interface; outputting educational clinical content from the set of educational clinical content that is ranked as the most useful educational clinical content of the set of educational clinical content based on the patient information and clinician information using the neural network; receiving user feedback through the user interface regarding the usefulness of the specific educational clinical content; and training the neural network in a second stage using the ranking data, the set of patient information, the set of clinician information, the patient information, the second patient information and the user feedback. The user feedback, for example, may include implicit feedback and/or explicit feedback.

The various embodiments described in the summary and this document are provided not to limit or define the disclosure or the scope of the claims.

DETAILED DESCRIPTION

An educational content recommender system for educational clinical content is disclosed. An educational content recommender system may receive input about a specific patient and a specific clinician to recommend educational clinical content for the specific clinician to use for the specific patient. Feedback from the specific clinician may be used to train the educational content recommender system. This feedback may include either or both explicit and implicit feedback items.

The information about the specific clinician (e.g., dentist, doctor, nurse, practitioner, medical assistant, etc.), for example, may include unchangeable information (e.g., date of birth or age of the clinician, etc.) and changeable information (e.g., experience of the clinician, etc.). The information about the specific patient may include unchangeable information (e.g., date of birth, age of the case, etc.) and changeable information (e.g., previous treatment).

A trigger for a request for educational clinical content, for example, may be generated by a computer system such as, for example, in response to clinician input. This trigger may be manually driven, hardcoded, or calculated. The trigger, for example, may include a user inputs patient information, a clinician asks a question to a support team, a clinician asks a question in a chat, etc. Once a trigger has occurred, the educational content recommender system can return useful educational clinical content to the clinician based on the patient information and clinician information using a machine learning system or machine learning algorithm. The usefulness of educational clinical content is a function of the specific clinician and the specific case. The educational content recommender system may receive feedback from the clinician, which may, for example, be used to calculate the usefulness of this educational clinical content relative to other items of educational clinical content. The feedback of usefulness, for example, may be measured by implicit means (e.g., times viewed, duration viewed) and explicit means (e.g., helpful for this case, helpful in general). The usefulness of all educational clinical content, for example, may be predicted for every clinician-case combination so that the next clinician can receive the most useful educational clinical content on demand.

New items of educational clinical content, for example, may be introduced to the educational content recommender system at any time such as, for example, to ensure a baseline usefulness score is in place, in response to clinician feedback, etc.

Figure 1:
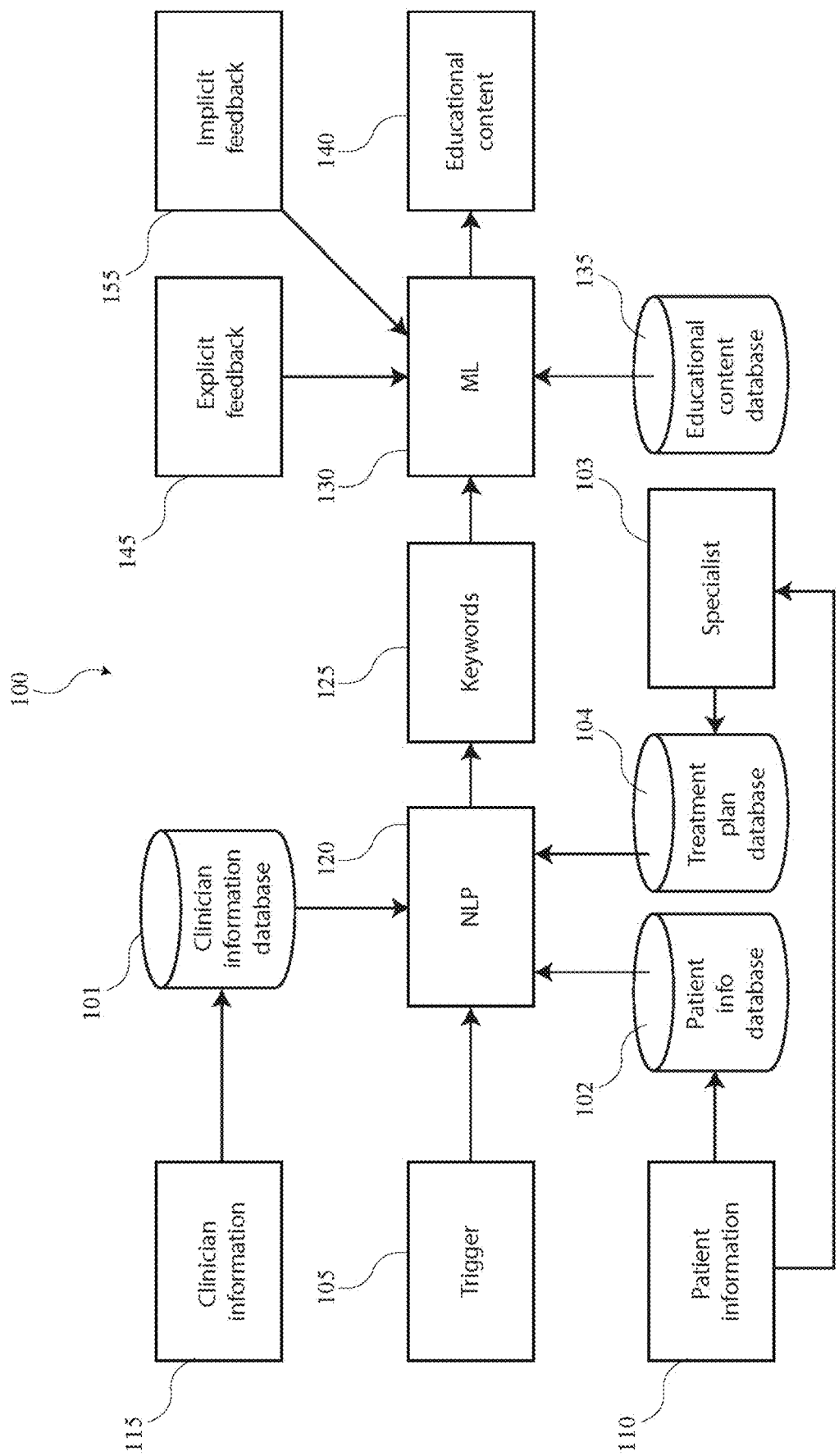
FIG. 1 is an example flowchart of an educational content recommender system.

FIG. 1 is an example flowchart of a process 100 for an educational content recommender system. The system may return clinical educational content for a specific treatment performed by a specific clinician for a specific patient. For example, the educational content recommender system may include or be part of a website that received information from clinicians, patients, and/or specialists that is used to create a treatment plan.

The process 100 may start at trigger 105. A trigger may include any number of events that can start the process 100. For example, a trigger 105 may occur when a clinician completes a form on a webpage or app hosted by the educational content recommender system. A form, for example, may allow a clinician to enter patient information, clinician information, or treatment plan information.

As another example, a trigger 105 may occur when a clinician support specialist (e.g., specialist 103) completes a form on a webpage or app hosted by the educational content recommender system. A form, for example, may allow a clinician support specialist to enter patient information, clinician information, or treatment plan information.

As another example, a trigger 105 may occur when a clinician or a clinician support specialist (e.g., specialist 103) asks or answers a question via a chat tool on a webpage or app hosted by the educational content recommender system. For example, if the clinician enters clinician interests or updates clinician interests within the educational content recommender system (e.g., in the clinician information database 101) a trigger may occur. Similar triggers may occur if the clinician enters or updates any other clinician information.

As another example, a trigger 105 may occur when a specialist 103 creates a treatment plan for a specific patient and a specific clinician.

As another example, a trigger 105 may occur when a clinician accesses a webpage or resource on a webpage or app hosted by the educational content recommender system.

As another example, a trigger 105 may occur when a patient event occurs within the clinical educational content recommender. A patient event, for example, may include a patient appointment for a clinical treatment, treatment milestone, etc.

As another example, a trigger 105 may occur when the clinicians education progression has changed.

As another example, a trigger 105 may occur based on clinician feedback. For example, a first clinician and a second clinician may be performing the same or similar treatments on different patients, and both patients may receive similar items of educational content. If the first clinician rates a first item of educational content highly, a trigger may occur with the second clinician to see if the first item of educational content may be deemed more useful to the second clinician based on the added feedback from the first clinician.

Figure 12:
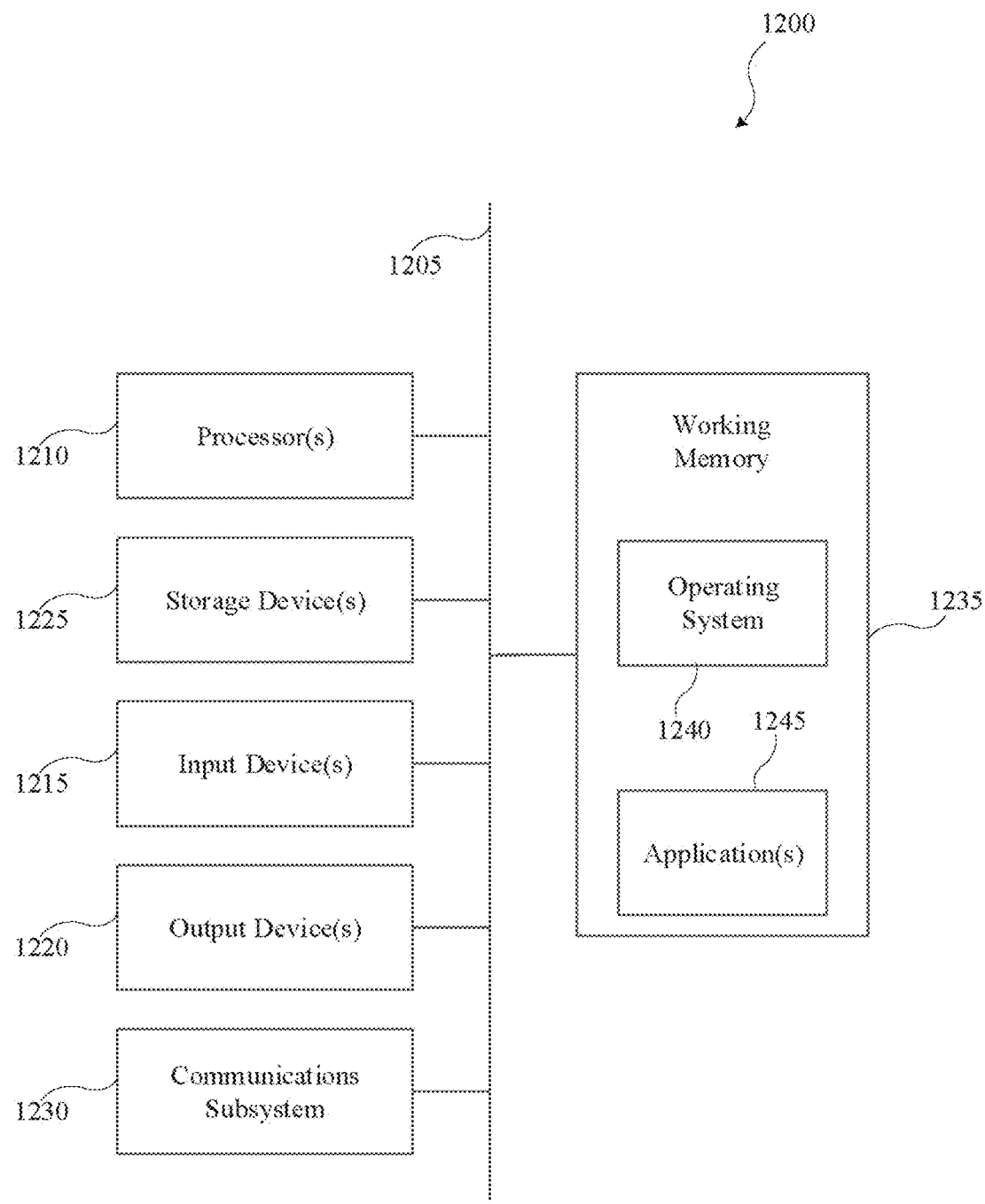
FIG. 12 is an example block diagram of a computational system that can be used to with or to perform some embodiments described in this document.

The patient information 110 may be entered into the patient information database 102 such as, for example, through one or more input devices 1215 and/or through communications subsystem 1230 of FIG. 12. The patient information may include clinical patient information and/or non-clinical patient information. Entry of the patient information, for example, may trigger the start of the process 100 at block 105.

Clinical patient information may, for example, include any or all of the following: data files about the patient, patient requirements, clinician assessments of the patient, clinician preferences, x-rays, patient records, patient notes, extra-oral photographs, intra-oral photographs, 3D image files (e.g., .stl or .dem), radiographic images (e.g., DPT/OPG or selected periapical views), etc.

Non-clinical patient information may, for example, include any or all of the following: patient motivations, patient concerns, treatment discussions, treatment timing, acceptable interventions, unacceptable interventions, etc.

Clinical patient information may, for example, include any or all of the following: patient name, patient sex, patient age, patient date of birth, prior dental treatment, prior dental treatment detail, prior orthodontics, prior orthodontics details, prior facial aesthetics, prior facial aesthetics details, patient fitness, patient dental fitness, patient occupation, patient dietary factors, patient drug history (recreational or medicinal), patient smoking history, patient alcohol history, patient teeth grinding (bruxer) history, upcoming events, outcomes, call outs, etc.

Clinical patient information may also include any type of dental details. These dental details may include any or all of the following: the upper dental center-line in relation to the midline of the face, the lower dental center-line in relation to the upper dental center-line, the lower dental center-line in relation to the midpoint of the chin, the amount of crowding in the upper arch, the amount of crowding in the lower arch, the amount of overjet, incisor relationship, amount of overbite, amount of open bite, molar relationship, the teeth in a crossbite, caries risk, perio risk, tooth surface loss, oral health pathology, dental pathology, facial pathology, oral hygiene, BPE, gingival biotype, etc.

Clinician information 115 may be input into a clinician information database 101 such as, for example, through one or more input devices 1215 and/or through a communications subsystem 1230 of FIG. 12. The clinical information 115, for example, may have been input or updated in the past. The clinical information may include information about the specific clinician that will perform the clinical treatment. The clinician information 115, for example, may be deposited in a clinician database. The clinician information 115 may include information about the specific clinician such as clinician experience, clinician years of experience, clinician's self-reported areas of interest, the number of specific treatments handled by the clinician, the number of different treatments handled by the clinician, the time since the clinician handled a specific treatment, etc.

The clinician information 115, for example, may include a third party assessment and/or categorization of the clinician.

A specialist 103 may create a treatment plan for the specific patient based at least in part on the patient information 110 (and/or the clinician information 115). The treatment plan may be stored in a treatment plan database 104 and may be input into the natural language processor 120 along with the specific patient information and the specific clinician information.

A treatment plan, for example, may include any plan that a clinician may follow to treat the specific patient based on the patient information 110 (and/or the clinician information 115). A treatment plan, for example, may include a treatment design (e.g., quantitative and qualitative information on the treatment) and/or specialist advice (e.g., the qualitative and quantitative information appended to the treatment design by the specialist 103). A treatment plan, for example, may include clinician information, patient information, treatment factors, prior feedback, etc.

The specialist 103, for example, may be a machine learning algorithm, an expert in the dental field (or orthodontics) or a combination of the two.

A treatment plan, for example, may include a treatment length, interproximal reduction, attachment requirements, auxiliaries, dual arch, elastics class, types, notes, advice, outcomes, complexity, diagnosis, treatment duration, summary of plan, alternative options, case callouts, consent requirements, auxiliaries IPR about, auxiliaries about, auxiliaries attachments about, touchpoints, wear schedule, refinements, restorative, retention, notes, consent advice, likely outcomes, complexity rating, diagnosis, treatment duration, summary of plan, alternative treatment options, case callouts, auxiliaries used, auxiliary type, IPR, IPR amount, IPR location, attachments used, attachment types, touchpoints, wear schedule, refinement advice, restorative advice, retention advice, etc.

A treatment plan, for example, may include graphics and/or animations that may, for example, show the results of the treatment plan. A natural language processor 120 may produce one or more keywords 125 from the clinician information, the patient information, and/or the treatment plan. The keywords 125 may be specific to the specific clinician, the specific patient, and/or the treatment plan.

The natural language processor 120, for example, may include any or all components of the computational system

1200 shown in FIG. 12. The natural language processor 120, for example, may execute on a local computation system or on a remote server.

The keywords 125 may be input into the machine learning algorithm 130. The machine learning algorithm 130 outputs one or more items of educational clinical content 140 from the content database 135 based the keywords 125. The one or more items of educational clinical content 140 may include all or part of an article, an image, text, a video, audio, etc.

The machine learning algorithm 130, for example, may execute on a computational system that include any or all components of the computational system 1200 shown in FIG. 12. The machine learning algorithm 130, for example, may execute on a local computation system or on a remote server.

The output of educational clinical content 140 may include a plurality of educational clinical content ranked in order of usefulness based on the keywords.

The machine learning algorithm 130 may receive various inputs to train the algorithm such as, for example, implicit feedback 155 and/or explicit user feedback 145. The implicit feedback 155, for example, may include the number of times the educational clinical content was viewed and/or the duration the educational clinical content was viewed. The explicit feedback, for example, may include a rating provided by the user such as, for example, labeling the educational clinical content as good, bad, or medium; a score from one to ten; etc.

As another example, the machine learning algorithm 130 may receive input from a specialist that may be used to train the machine learning algorithm 130. For example, a specialist may input various types and kinds of patient information, clinician information, and/or a treatment plans along with recommended educational clinical content based on the patient information, clinician information, and/or a treatment plan.

Figure 2:
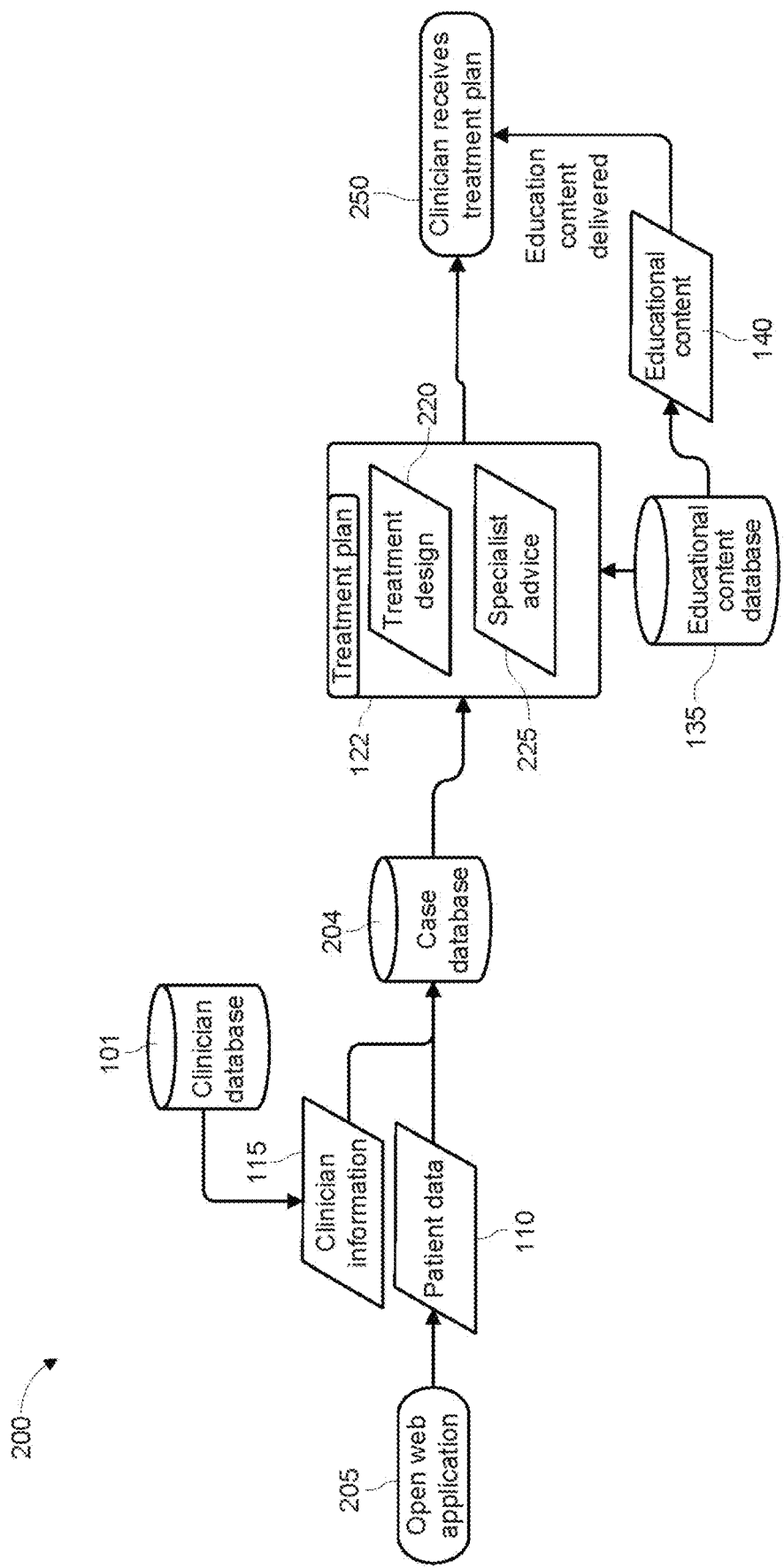
FIG. 2 is an example flowchart of an educational content recommender system.

FIG. 2 is an example flowchart of another process 200 for training a machine learning educational content recommender system.

The clinician database 101, for example, may include information about a specific clinician as mentioned above. For each clinician, the clinician database 101, for example, may include basic information about a clinician such as clinician experience, clinician years of experience, clinician's self-reported areas of interest, the number of specific treatments handled by the clinician, the number of different treatments handled by the clinician, the time since the clinician handled a specific treatment, etc. For each clinician, the clinician database 101, for example, may include an assessment and/or categorization of the clinician.

The case database 204, for example, may be a database of information for specialists that may be used to provide specialist advice in block 225. The case database 104, for example, may include personal notes, records advice, outcomes, complexity, diagnosis, treatment duration, summary of the treatment plan, alternative options, case callouts, consent, auxiliaries IPR about, auxiliaries about, auxiliaries attachments about, touchpoints, wear schedule, refinements, restorative, retention, etc.

A clinician may open a web-based application 205, which may trigger process 200 to begin. The clinician may enter various patient or clinician data.

At patient information 110 may be input into the case database 204 and may include any of the patient data or information described in this document.

Clinician information 115 may be pulled from the clinician database 101. The clinician database 101, for example, may include information about a plurality of clinicians; the clinician information 115 for a specific clinician may be retrieved. The clinician information and the patient information may be combined and placed in the treatment plan database 104.

A treatment plan 122 may be created and/or assigned to a specific patient that includes a treatment design 220 and/or specialist advice 225 by a specialist based on the patient information and the clinician information in the treatment plan database 104. The treatment plan 122, for example, may include any plan for the clinician to treat a patient based on the clinician information and the patient information. A treatment plan, for example, may include a treatment design 220 (e.g., quantitative and qualitative information on the treatment) and specialist advice 225 (e.g., the qualitative and quantitative information appended to the treatment design by an expert). A treatment plan 122, for example, may include clinician information, patient information, treatment factors, prior feedback.

The specialist advice 225 may be entered and/or provided by a specialist. The combination of treatment design and specialist advice (e.g., treatment plan) may comprise a treatment plan 122.

Educational clinical content 140 may be chosen from the content database 135 based on keywords associated with the treatment design 220, which may or may not, for example, be prepared by the specialist. This educational clinical content may be provided to the clinician. The educational clinical content and/or the treatment plan may or may not be added to the treatment plan database 104. The content database 135 may include educational clinical content such as, for example, training videos, scholarly papers, training web pages, etc.

The educational clinical content 140 may be chosen from the content database 135 using a machine learning algorithm that selects educational clinical content based on clinician information, patient information, treatment factors, prior feedback, etc. The educational clinical content 140 may be delivered to the clinician at block 250.

Figure 3:
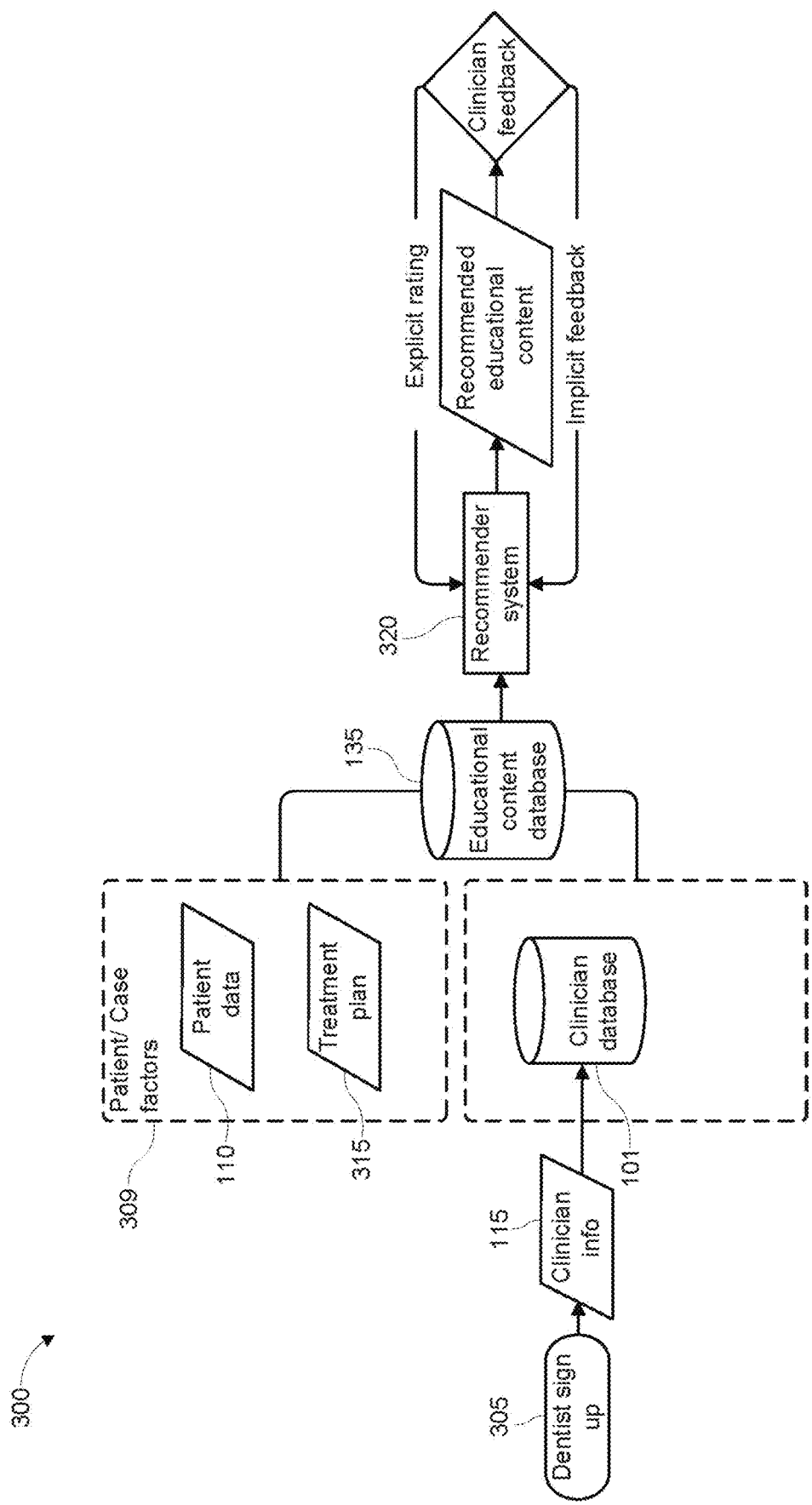
FIG. 3 is an example flowchart of an educational content recommender system.

FIG. 3 is an example flowchart of another process 300 of an educational clinical content recommender process. At block 305, a clinician can sign up through a web application, which may be part of an educational clinical content recommender process. Clinician information 115 may be input and added to the clinician database 101.

Patient information 110 may be input into the content database 135. The treatment plan 315 may be input into the content database 135. The patient information 110 and/or the clinician information 115 may be input prior to or in real time with the process 300. The educational content recommender system 320 can receive the patient information, the treatment plan (e.g., treatment design and specialist advice), and/or the clinician information. Based on machine learning and/or future machine learning, the educational content recommender system 320 can select educational clinical content from the content database 135 based on the patient information, treatment plan, and/or the clinician information.

The educational clinical content can be sent to the clinician. The clinician may provide feedback to the educational content recommender system 320. This feedback, for example, may include an explicit rating of the educational clinical content and/or implicit feedback. The implicit feedback, for example, may include the number of times the educational clinical content was viewed and/or the duration the educational clinical content was viewed. This feedback may be used to further train the educational content recommender system 320.

Figure 4:
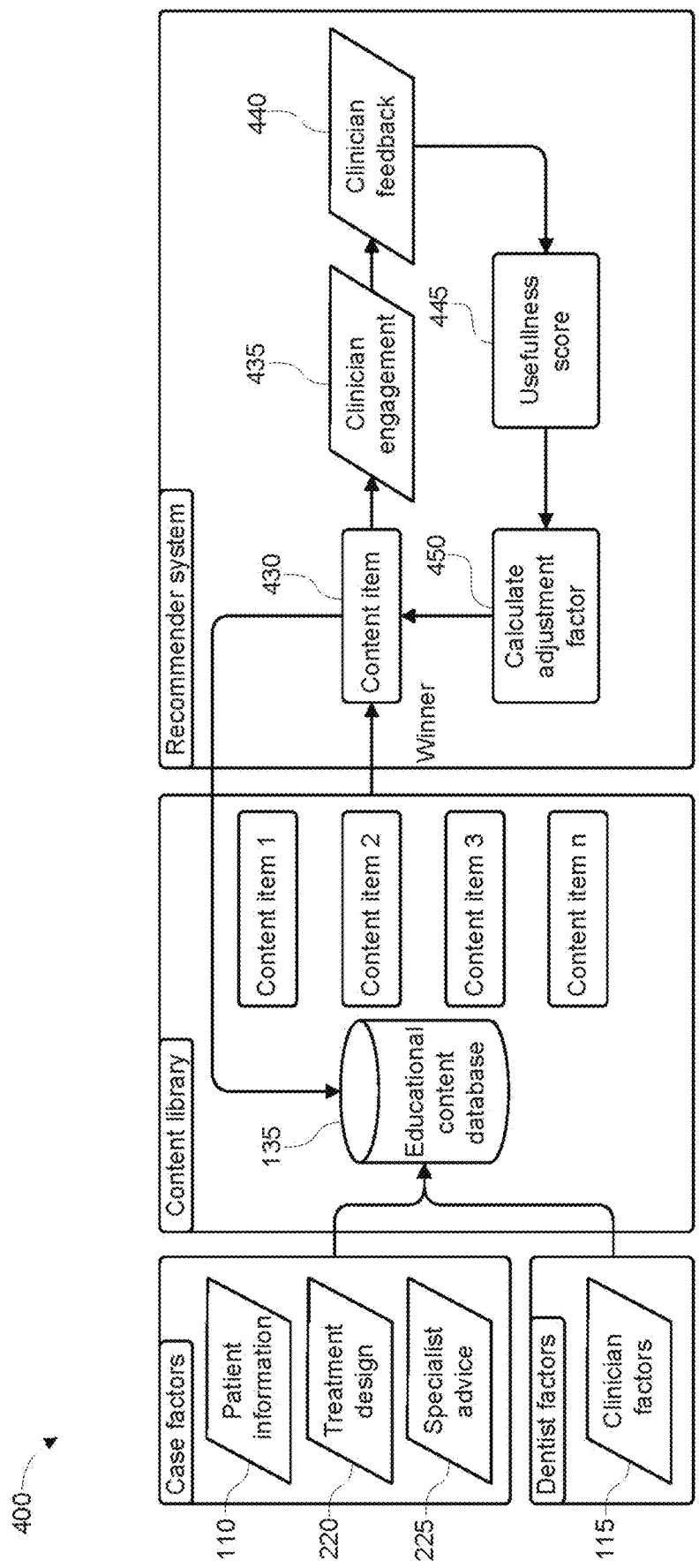
FIG. 4 is an example flowchart of an educational content recommender system.

FIG. 4 is an example flowchart of a process 400 of an educational content recommender system. A winning educational clinical content item 430 can be selected from the content database 135 based on the patient information 110, the treatment design 220, the specialist advice 225, and/or the clinician information 115 (e.g., information about a clinician stored in the clinician database). Each item of educational clinical content in the content database 135 may be associated with one or more educational clinical content keywords. The information from the patient information 110, the treatment design 220, the specialist advice 225, and/or the clinician information 115 may be matched or associated with the one or more educational clinical content keywords. These keywords, for example, may include title, text, summary, images, video, audio, etc. The keywords, for example, may include keywords related to clinicians such as, for example, case experience, age, previous case experience, experience, dental specialties, etc.

keywords, for example, may include keywords related to patients/cases/treatment, these patient keywords may include diagnosis, age, oral health, previous orthodontic work, medical diagnosis, patient expectations, patient hygiene, lip filler, Botox, level of malocclusion, wedding, relapse, spacing, overjet, underjet, Hollywood, pregnancy, fear, refinement, extraction, spacing, black triangle, etc., etc.

Keywords, for example, may include treatment length, interproximal reduction, attachments, auxiliaries, auxiliary, dual arch, elastics class, types, etc. These keywords may include specialist advice factors that may, for example, include complexity, outcomes, call outs, complex, mild, elastics, recession, refinement, remote monitoring, chewies, wedding, etc.

Figure 10:
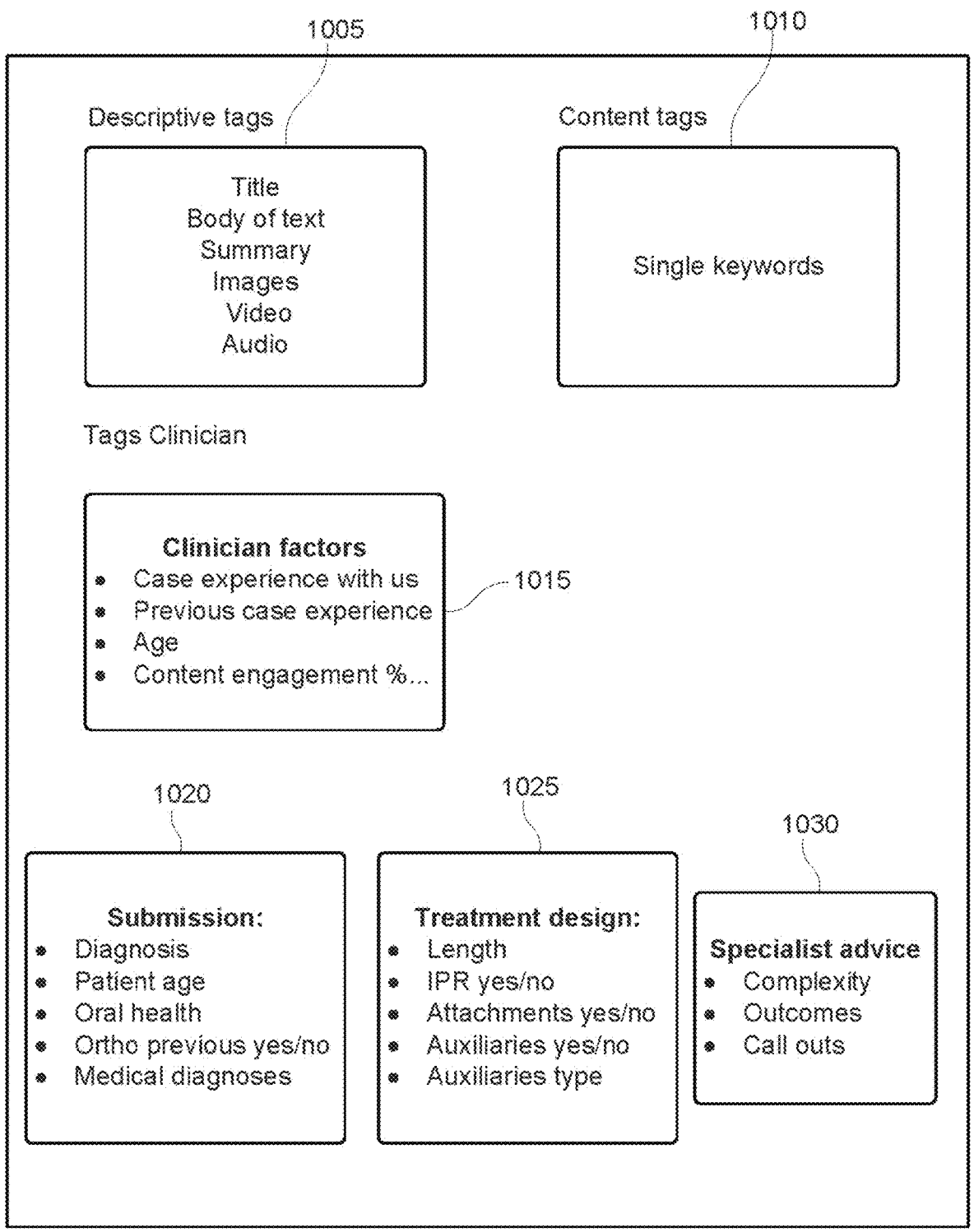
FIG. 10 is an example block diagram showing the various types of tags or keywords for an item of educational clinical content.

The keywords may include any of the tags shown in FIG. 10.

The clinician information, for example, may include case experience, age, previous case experience, experience, etc. The case factors 309 (e.g., the patient information and treatment plan) may include diagnosis, age, oral health, previous orthodontic work, medical diagnosis, patient expectations, treatment length, IPR, attachments, auxiliaries, auxiliary types, complexity, outcomes, call outs, etc.

The educational content recommender system 320, for example, may determine or calculate a winning educational clinical content item 430 from the content database 135 based on the clinician information 302 and the case factors 309. The winning educational clinical content item 430 may be engaged by the clinician at block 435.

The clinician may provide either or both implicit or explicit feedback about the clinician's engagement with the winning educational clinical content item 430 at block 440. Implicit feedback may include the number of times the educational clinical content was viewed, how long it was viewed, etc. Explicit feedback may include a rating provided by the user such as, for example, labeling the educational clinical content as good, bad, or medium; a score from one to ten; etc. The implicit feedback and/or the explicit feedback, for example, may be combined into a usefulness score at block 445. The implicit feedback and/or explicit feedback, for example, may include any listed or unlisted feedback.

In one example, the clinician can score the educational clinical content as good, medium, and bad. A good score, for example, may boost the rank of the item of educational clinical content. A bad score, for example, may decrease the rank of the item of educational clinical content. A medium score, for example, may do nothing. As another example, a feedback score may include a calculated feedback score.

An adjustment factor for the winning educational clinical content item 430 may be calculated based on the usefulness score at block 450. The usefulness score may be used by the educational content recommender system 320 to train a neural network that updates/revises how the educational content recommender system 320 determines the winning educational clinical content item 430 based on the patient information 110, the treatment design 220, the specialist advice 225, and/or the clinician information 115. The feedback, for example, may emphasize or deemphasize either or a keyword associated with the winning educational clinical content item 430 and/or the winning educational clinical content item 430.

Figure 5:
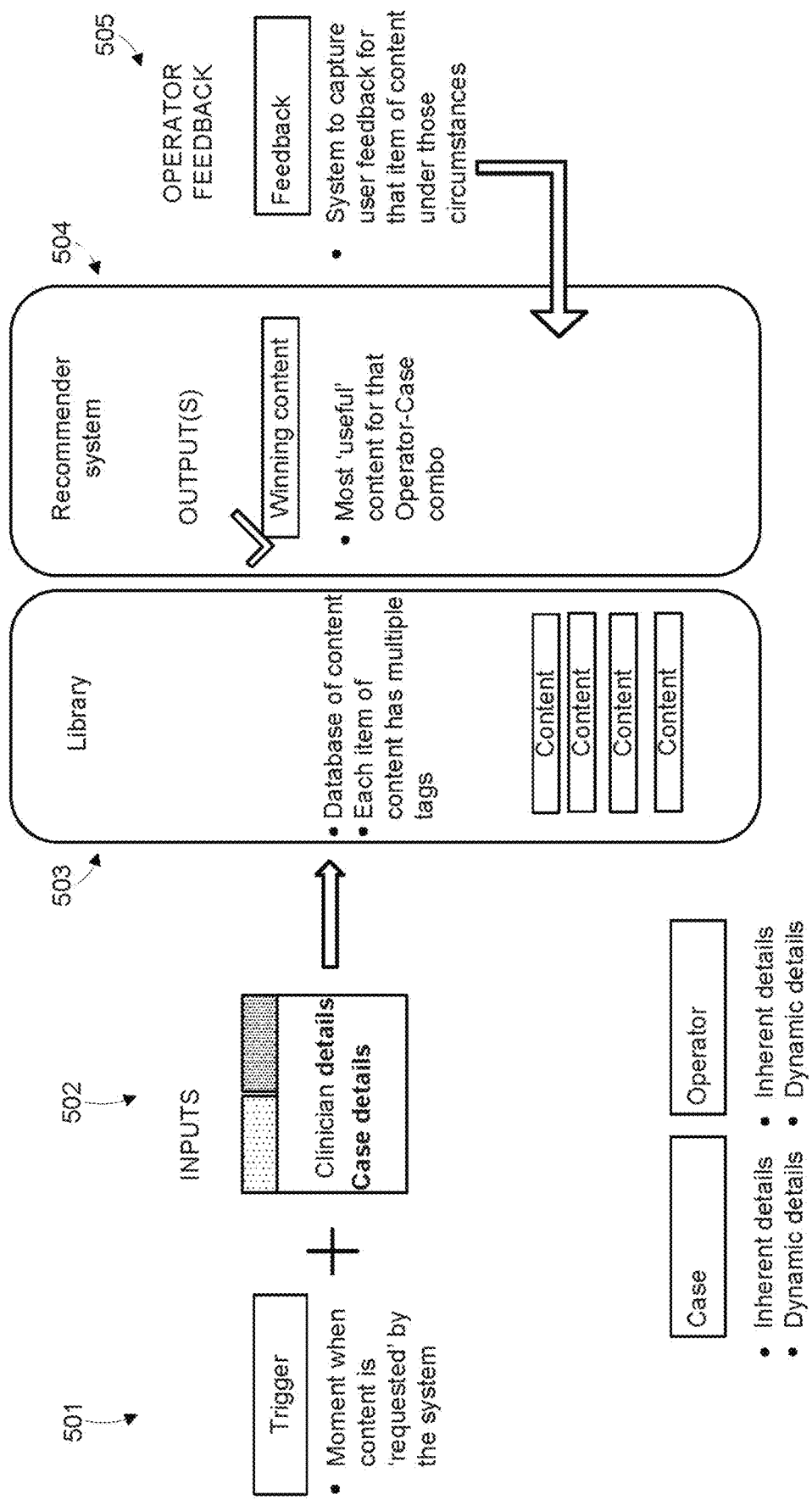
FIG. 5 is an example diagram of inputs to the educational content recommender system.

FIG. 5 is an example diagram of an educational content recommender system with representations of the inputs to the educational content recommender system. A trigger 501 may be initiated by a clinician, a user, or by the educational content recommender system. Once the trigger has occurred, both the clinician information and/or the case factors may be input into the educational content recommender system at the input 502. The educational content recommender system 504 provides a selection of useful educational clinical content from the content database 135 based on both the clinician information and the case factors. The educational content recommender system also receives clinician feedback 506 that can be used to train the educational content recommender system, which may result in an adjustment of future selections of useful educational clinical content based on inputs of clinician information and/or case factors.

Figure 6:
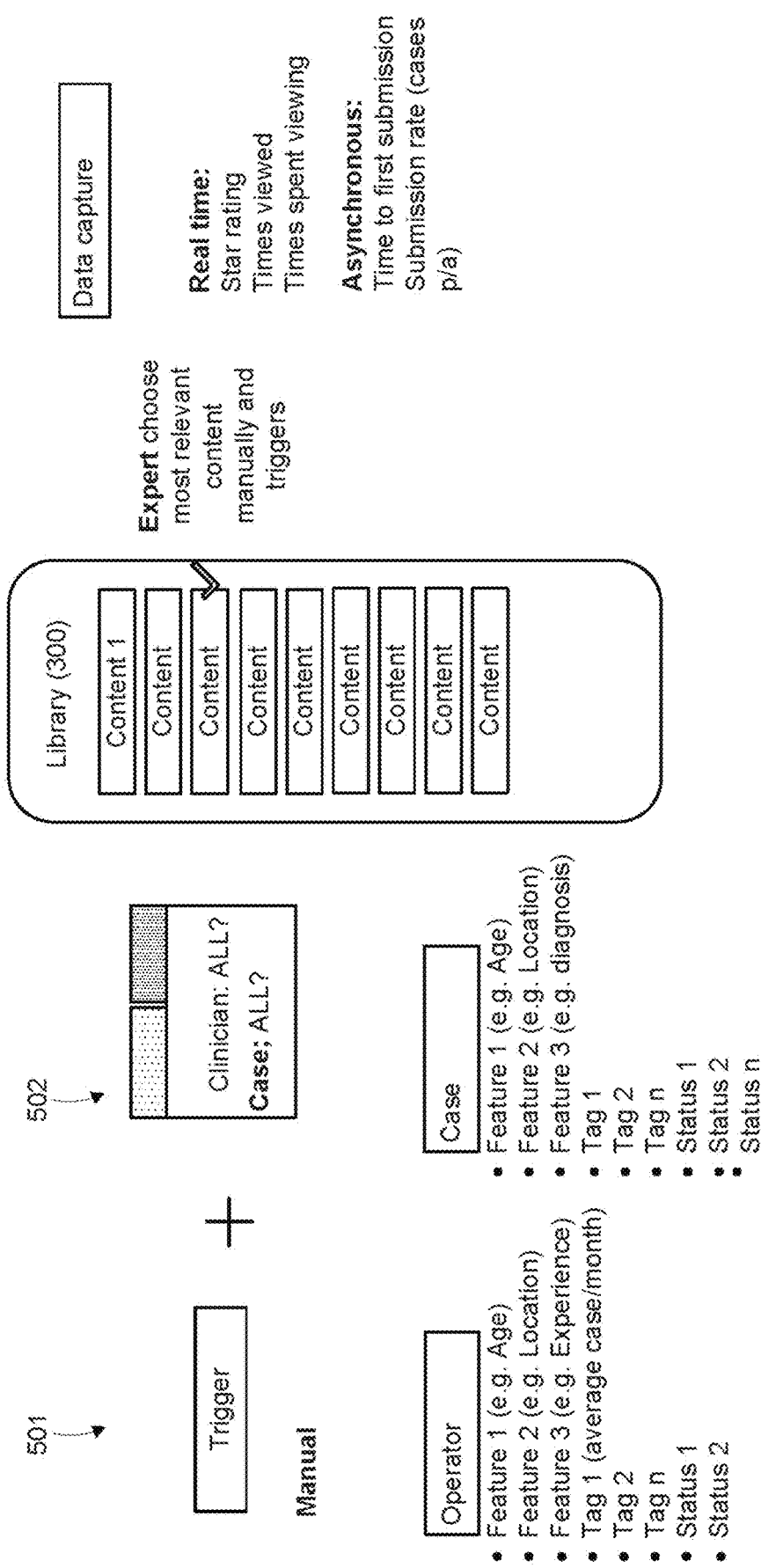
FIG. 6 is an example diagram of an educational content recommender system with representations for building a recommender dataset.

FIG. 6 is an example diagram of an educational content recommender system with representations for building the recommender dataset(s). When building the dataset(s) the trigger 501 is a manual trigger. While building the dataset(s) the clinician information and case information (e.g., clinician information, patient information, and/or treatment plan) may be input at the input 502. Multiple clinicians and/or cases may be inputted to build the dataset(s). When the information about the clinician, patient, or treatment is input, the information may be flagged or categorized. The educational clinical content library 503 may be reviewed by an expert to provide an initial usefulness score or rating to each educational clinical content in the educational clinical content library 503 for different combinations of clinician information and case information such as, for example, for every permutation or combination of clinician information and case information.

Figure 7:
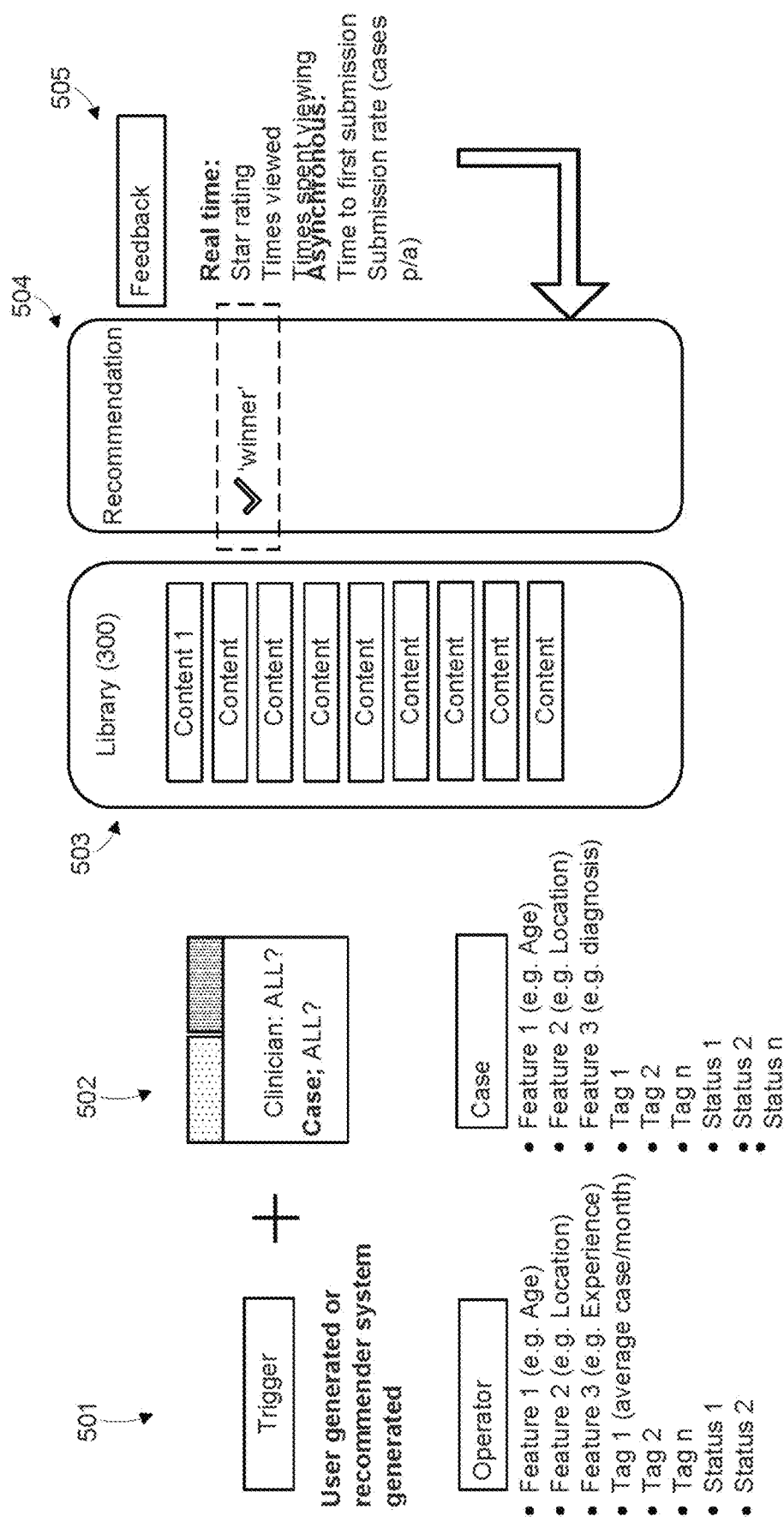
FIG. 7 is an example diagram of an educational content recommender system with machine learning.

FIG. 7 is an example diagram of an educational content recommender system with machine learning. A trigger 501 may be initiated by a clinician, a user, or by the educational content recommender system. Once the trigger has occurred, both the clinician details and the case details are input into the educational content recommender system at the input 502. The educational clinical content library 503 includes the educational clinical content shown in FIG. 6. The educational content recommender system 504 will select useful educational clinical content from the educational clinical content library 503. The usefulness of educational clinical content may be previously ranked based on feedback so the trigger 501 can more quickly pull the useful educational clinical content from the educational clinical content library 503.

The educational content recommender system 504 may build the educational clinical content library 503 by tagging each item of educational clinical content with one or more keywords indicating a usefulness rank of each item of educational clinical content for a given clinician information and/or clinician information, patient information, and clinician information.

Once the recommended educational clinical content is delivered to the clinician, the educational content recommender system 504 may receive both implicit feedback and explicit feedback about the educational clinical content. This feedback can be used to revise future recommendations based on machine learning and the clinician information and the case information.

Figure 8:
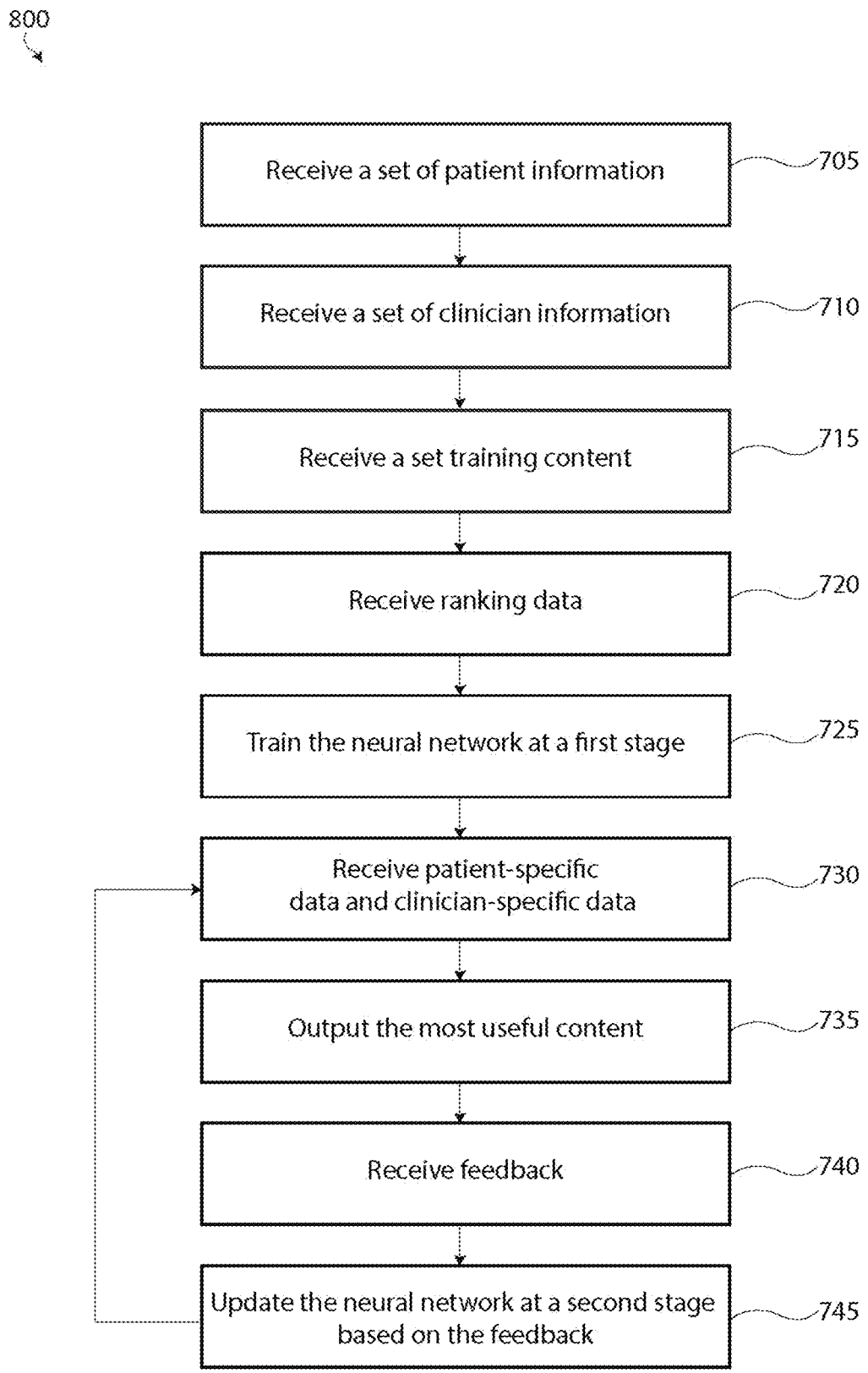
FIG. 8 is a flowchart of an example process to train and use a neural network for recommending educational clinical content based on patient and clinician information.

FIG. 8 is a flowchart of an example process 800 that can be used to train and use a neural network for recommending educational clinical content based on patient and clinician information. At block 705 a set of patient information may be received.

The patient information may, for example, include any or all of the following basic patient information, data files about the patient, patient requirements, clinician assessments of the patient, clinician preferences, etc. The data files may include, for example, x-rays, patient records, patient notes, etc. The data files may include, for example, extra-oral photographs, intra-oral photographs, 3D image files (e.g., .stl or .dcm), radiographic images (e.g., DPT/OPG or selected periapical views), etc.

The patient information may, for example, include any or all of the following: patient motivations, patient concerns, treatment discussions, treatment timing, acceptable interventions, unacceptable interventions, etc.

The patient information may also include any or all of the following: patient name, patient sex, patient age, patient date of birth, prior dental treatment, prior dental treatment detail, prior orthodontics, prior orthodontics details, prior facial aesthetics, prior facial aesthetics details, patient fitness, patient dental fitness, patient occupation, patient dietary factors, patient drug history (recreational or medicinal), patient smoking history, patient alcohol history, patient teeth grinding (bruxer) history, etc.

The patient information may also include any type of dental details. These dental details may include any or all of the following: the upper dental center-line in relation to the midline of the face, the lower dental center-line in relation to the upper dental center-line, the lower dental center-line in relation to the midpoint of the chin, the amount of crowding in the upper arch, the amount of crowding in the lower arch, the amount of overjet, incisor relationship, amount of overbite, amount of open bite, molar relationship, the teeth in a crossbite, caries risk, perio risk, tooth surface loss, oral health pathology, dental pathology, facial pathology, oral hygiene, BPE, gingival biotype, etc.

At block 710, a set of clinician information may be received. The set of clinician information, for example, may include the information stored in clinician database 101. The set of clinician information, for example, may include basic information about a clinician such as clinician experience, clinician years of experience, clinician's self-reported areas of interest, etc. For each clinician, the clinician database 101, for example, may include an assessment and/or categorization of the clinician.

At block 715 a block of training educational clinical content can be received. The training educational clinical content may include educational clinical content and/or in the content database 135.

At block 720 ranking data may be received. Ranking data, for example, may include keywords for each item of training educational clinical content that ranks a specific item of educational clinical content for relevance based on the clinician information received at block 705 and/or the patient information received at block 710 from a specific source. The ranking data, for example, may include rankings from a plurality of different sources. An item of ranking data for a specific item of educational clinical content may be received from a specific source and may be based on the source's perception of the clinical value of the specific item of educational clinical content based on patient information and/or clinician information.

The ranking data, for example, may include associating a keyword with an item of educational clinical content based on the text matches between items within a treatment plan that includes both clinician information and patient information, and keywords associated with the educational clinical content. The text matches may be learned by a neural network (or machine learning algorithm) based on feedback and/or specialist advice.

At block 725 a neural network (or machine learning algorithm) can be trained based on the ranking data received at block 720. This first stage of neural network processing may provide keywords to each item of educational clinical content based on the ranking data.

At block 730 patient information for a specific patient and clinician information for a specific clinician may be received.

At block 735 the most useful educational clinical content may be produced based on the patient information and the clinician information. For example, the most useful educational clinical content may be selected from the database based on keywords produced in block 725. As another example, at block 725 each item of educational clinical content can be scored or ranked based on combinations of patient information and clinician information. At block 735, the highest ranked (or scored) educational clinical content may be provided or a listing of the highest ranked (or scored) educational clinical content may be provided. For example, the most useful educational clinical content may be produced based on the number of keywords associated with the educational clinical content that match keywords within the treatment plan times a multiplication factor. The multiplication factor may be increased or decreased, in future outputs, based on feedback provided in block 740. The multiplication factor may be applied to an item of educational clinical content, and/or one or more keywords associated with an item of educational clinical content.

For example, at block 735 a machine learning algorithm may receive a treatment plan (e.g., clinician information, patient information, treatment factors, specialist advice, etc.) and select an item of educational clinical content with the greatest educational clinical content score based on the treatment plan. For example, if a first educational clinical content item has six keywords associated with the treatment plan and a second educational clinical content item has four keywords associated with the treatment plan, the first educational clinical content item will be selected over the second educational clinical content item because it has a total educational clinical content score of six to four. As another example, if the machine learning algorithm weighs specific keywords and/or educational clinical content items lower or higher with respect to educational clinical content or feedback then the educational clinical content score may be increased or decreased accordingly.

At block 740 feedback can be received about the educational clinical content viewed by a user. The feedback, for example, may include user provided feedback such as, for example, in response to a question about the usefulness of the educational clinical content. The feedback, for example, may include information about the number of times the user viewed the selected educational clinical content. Multiple views might suggest the educational clinical content is more useful.

The feedback, for example, may include information about the amount of time the user viewed the selected educational clinical content. The longer the educational clinical content is viewed the greater the value of the educational clinical content. For example, for video educational clinical content, the feedback may include the percentage of the entire video viewed by the user. As another example, for other educational clinical content, the feedback may include the amount of time the user viewed the educational clinical content or scrolled through the educational clinical content.

The feedback, for example, may include information about the number of times the user viewed the educational clinical content over a given period of time (e.g., a day, an hour, etc.). The feedback, for example, may include information regarding whether the user reversed the playback of the educational clinical content, scrolled up on the educational clinical content, underlined or highlighted portions of the educational clinical content, etc.

At block 745, the neural network may be updated based on the feedback to the specific educational clinical content provided with the for the patient information and the clinician information for a specific clinician. This update may result in an adjustment or revision to the ranking of the educational clinical content. For example, the weight of the keywords may be updated based on the feedback.

After block 745, the process returns to block 730 and repeats.

If new educational clinical content is introduced, the new educational clinical content may be ranked as per block 720 with some or all of the clinician information and/or patient information.

Figure 9:
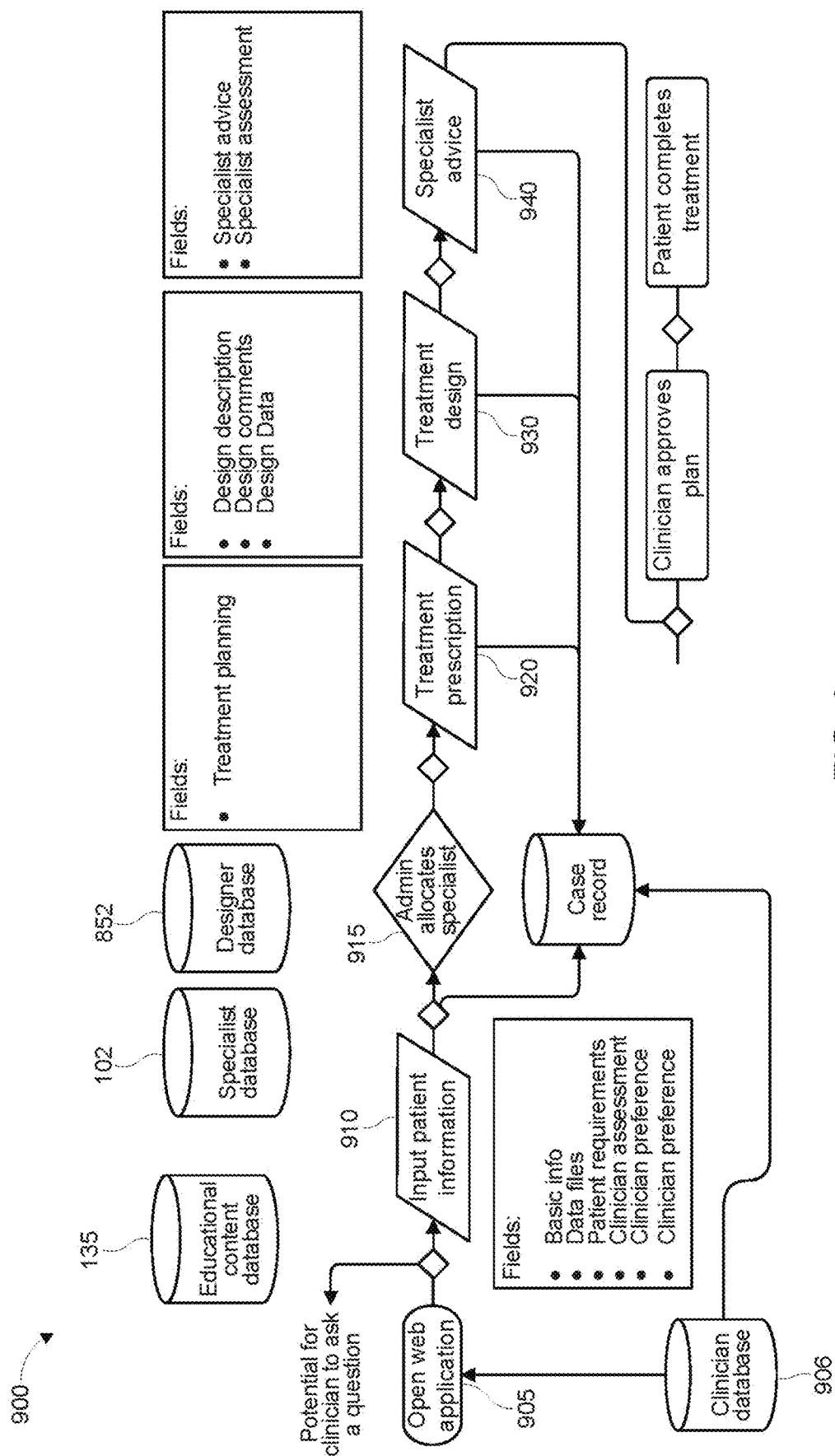
FIG. 9 is an example flowchart of a process that may be followed for a clinician to receive relevant educational clinical content for a treatment based on the information about the clinician and information about the clinician, patient, and/or the procedure during a first training stage.

FIG. 9 is an example flowchart of a process 900 that a clinician may follow to receive relevant educational clinical content for a treatment based on the information about the clinician and information about the patient and/or the procedure during a first training stage.

At block 905, a user may open a web page that has access to the clinician database 806.

At block 910, a user may enter some information about the patient and/or clinician such as, for example, patient requirements, clinician assessment, clinician preferences, etc.

At block 915, a specialist may be allocated to provide recommended educational clinical content and/or train a neural network.

At block 920, information about a treatment prescription, treatment plan and/or specialist advice may be entered by the user.

At block 930, information about a treatment plan may be input. This information, for example, may include design description, design comments, design data, etc.

At block 940, information about specialist advice can be entered. This information, for example, may include specialist advice, specialist assessment, etc.

FIG. 10 is an example block diagram showing the various types of tags (or keywords) for an item of educational clinical content. Each item of educational clinical content, for example, may include descriptive tags 1005, educational clinical content tags 1010, clinician tags 1015, submission tags 1020, treatment design tags 1025, specialist advice tags 1030 etc. The descriptive tags 1005 may be descriptive of the educational clinical content and may, for example, include educational clinical content title, a summary, body text, images, audio, video, etc. Educational clinical content tags 1010, for example, may include single keywords indicative of the educational clinical content. clinician tags 1015, for example, may include clinician case experience, previous case experience, clinician age, previous educational clinical content engagement, clinician training, etc. Submission tags 1020, for example, may include diagnosis, patient age, patient oral health, patient ortho experience, patient medical diagnosis, etc. Treatment design tags 1025, for example, may include treatment length, IPR, auxiliaries, attachments, auxiliary types, etc. Specialist advice tags may include complexity tags, outcome tags, callout tags, etc.

Figure 11:
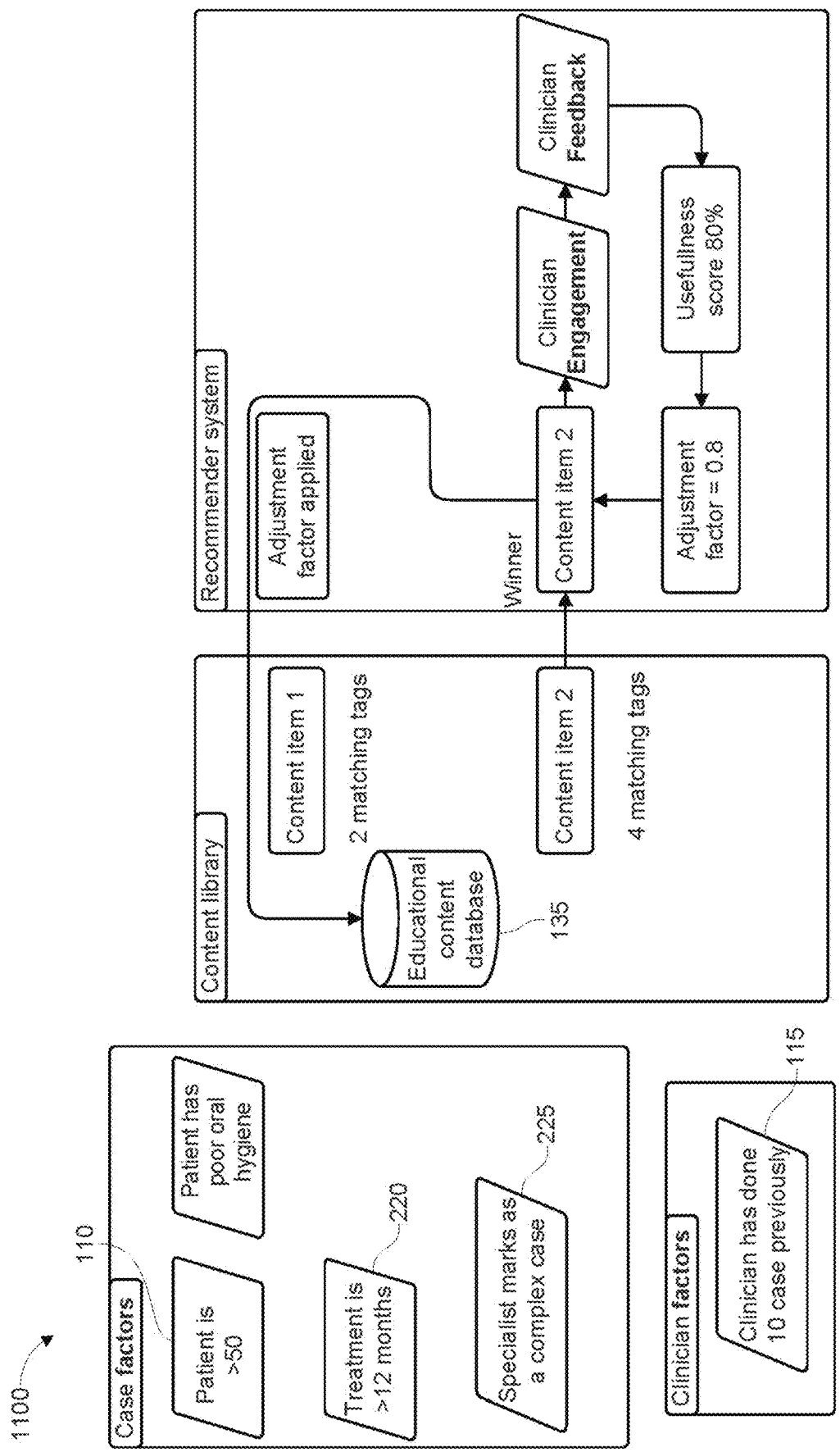
FIG. 11 is an example of an educational content recommender system.

FIG. 11 is a flow chart of process 1100 that is a specific example of the process shown in FIG. 4. The patient information 110, in this specific example, includes the following information: the patient is older than 50 years old and the patient has poor oral hygiene. The treatment design 220, in this specific example, includes the following information: the treatment takes longer than 12 months. The specialist advice 225, in this specific example, includes: this is a complex case. The clinician information, in this specific example, includes: the clinician has performed this procedure 10 times. Based on these specific factors, two items of educational clinical content are available in the content database 135: educational clinical content item 1 with two matching keywords and educational clinical content item 2 with four matching keywords.

In this specific example, educational clinical content item 2 is selected by the educational content recommender system based on the educational clinical content item having more keywords and provided to the client. In this specific example, a usefulness score of 80% is returned and an adjustment factor of 0.8 is applied to the educational clinical content item 2 when matched with the specific keywords.

The computational system 1200, shown in FIG. 12 can be used to perform any of the examples described in this document. One or more computational systems may be used. For example, computational system 1200 can be used to execute all or parts of processes 200, 300, 400, 800, 900, and/or 1100. As another example, computational system 1200 can perform any calculation, identification and/or determination described here. computational system 1200 may be a web server or other remote server.

Computational system 1200 includes hardware elements that can be electrically coupled via a bus 1205 (or may otherwise be in communication, as appropriate). The hardware elements can include one or more processors 1210, including without limitation one or more general-purpose processors and/or one or more special-purpose processors (such as digital signal processing chips, graphics acceleration chips, and/or the like); one or more input devices 1215, which can include without limitation a mouse, a keyboard, scanner, input from an imaging device, input from another computer or computer system and/or the like; and one or more output devices 1220, which can include without limitation a display device, a printer and/or the like.

The computational system 1200 may further include (and/or be in communication with) one or more storage devices 1225, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1200 might also include a communications subsystem 1230, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 1230 may permit data to be exchanged with a network (such as the network described below, to name one example), and/or any other devices described in this document. In many embodiments, the computational system 1200 will further include a working memory 1235, which can include a RAM or ROM device, as described above.

The computational system 1200 also can include software elements, shown as being currently located within the working memory 1235, including an operating system 1240 and/or other code, such as one or more application programs 1245, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1225 described above.

In some cases, the storage medium might be incorporated within the computational system 1200 or in communication with the computational system 1200. In other embodiments, the storage medium might be separate from a computational system 1200 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1200 and/or might take the form of source and/or installable code, which, upon compilation and/or installation on the computational system 1200 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
storing a plurality of educational clinical content items in a database, each of the plurality of educational clinical content items used by a clinician to provide a clinical treatment to a patient;
receiving patient information about a specific patient;
receiving clinician information about a specific clinician, wherein the clinician information comprises one or more the following information of clinician experience, clinician years of qualification, clinician areas of interest, the number of specific treatments handled by the clinician, the number of different treatments handled by the clinician, and the time since the clinician handled a specific treatment;
generating one or more keywords from the patient information and the clinician information by utilizing a natural language processor, wherein the one or more keywords depend on the patient information and the clinician information;
inputting the one or more keywords into a machine learning system that selects an educational clinical content item from the plurality of educational clinical content items based on the one or more keywords;
outputting the selected educational clinical content item to a user through a user interface, wherein the selected educational clinical content item comprises one or more of the following instructional videos, instructional presentations, and instructional articles;
receiving explicit feedback through the user interface regarding the usefulness of the selected educational clinical content item;
generate an implicit feedback measure based on the number of times the selected educational clinical content item was viewed and/or the duration the selected educational clinical content item was viewed;
generating a usefulness score based on the explicit feedback and the implicit feedback; and
training the machine learning system based on the usefulness score to improve the machine learning function.

2. A system comprising:
a storage medium storing a plurality of educational clinical content items in a database, each of the plurality of educational clinical content items used by a clinician to provide a clinical treatment to a patient; and
a processor electrically coupled with the storage medium, the processor:
receives patient information about a specific patient;
receives clinician information about a specific clinician, wherein the clinician information comprises one or more the following information of clinician experience, clinician years of qualification, clinician areas of interest, the number of specific treatments handled by the clinician, the number of different treatments handled by the clinician, and the time since the clinician handled a specific treatment;
executes a natural language function that inputs the patient information and the clinician information and produces one or more keywords, wherein the one or more keywords depend on the patient information and the clinician information;
executes a machine learning function that selects an educational clinical content item from the plurality of educational clinical content items stored in the storage medium based on the one or more keywords from the one or more keywords;
outputs the selected educational clinical content item to a user through a user interface, wherein the selected educational clinical content item comprises one or more of the following instructional videos, instructional presentations, and instructional articles;
receive explicit feedback through the user interface regarding the usefulness of the selected educational clinical content item;
generate an implicit feedback measure based on the number of times the selected educational clinical content item was viewed and/or the duration the selected educational clinical content item was viewed;
generate a usefulness score based on the explicit feedback and the implicit feedback; and
train the machine learning system based on the usefulness score to improve the machine learning function.

3. The method according to claim 1, wherein the machine learning system selects a portion of an educational clinical content item from the plurality of educational clinical content items based on the one or more keywords.

4. The method according to claim 1, wherein the patient information includes clinical patient information and nonclinical patient information.

5. The method according to claim 1, wherein the one or more keywords comprises a nonclinical keyword and a clinical keyword.

6. The method according to claim 1, wherein the patient information comprises one or more items selected from the group consisting of patient age, patient sex, data files about the patient, patient requirements, clinician assessments of the patient, clinician preferences, extra-oral photographs, intra-oral photographs, 3D image files, radiographic images, patient motivations, patient concerns, treatment discussions, treatment timing, intervention preferences, patient name, patient sex, patient age, patient date of birth, prior dental treatment, prior dental treatment, prior orthodontics treatment details, prior facial aesthetics, prior facial aesthetics, patient fitness, patient dental fitness, patient occupation, patient dietary factors, patient drug history, patient smoking history, patient alcohol history, and patient teeth grinding history.

7. The method according to claim 1, wherein the patient information comprises one or more items selected from the group consisting of upper dental center-line in relation to the midline of the face, lower dental center-line in relation to the upper dental center-line, lower dental center-line in relation to the midpoint of the chin, amount of crowding in the upper arch, an amount of crowding in the lower arch, the amount of overjet, incisor relationship, amount of overbite, amount of open bite, molar relationship, the teeth in a crossbite, caries risk, perio risk, tooth surface loss, oral health pathology, dental pathology, facial pathology, oral hygiene, BPE, and gingival biotype.

8. A system comprising
a storage medium storing a plurality of educational clinical content items in a database, each of the plurality of educational clinical content items used by a clinician to provide a clinical treatment to a patient; and
a processor electrically coupled with the storage medium, the processor:
receives patient information about a specific patient;
receives clinician information about a specific clinician, wherein the clinician information comprises one or more the following information of clinician experience, clinician years of qualification, clinician areas of interest, the number of specific treatments handled by the clinician, the number of different treatments handled by the clinician, and the time since the clinician handled a specific treatment;

executes a natural language function that inputs the patient information and the clinician information and produces one or more keywords, wherein the one or more keywords depend on the patient information and the clinician information;

executes a machine learning function that selects an educational clinical content item from the plurality of educational clinical content items stored in the storage medium based on the one or more keywords from the one or more keywords;

outputs the educational clinical content item to a user through a user interface, wherein the educational clinical content comprises one or more of the following instructional videos, instructional presentations, and instructional articles;

receive explicit feedback through the user interface regarding the usefulness of the outputted educational clinical content item;

generate an implicit feedback measure based on the number of times the outputted educational clinical content item was viewed and/or the duration the outputted educational clinical content item was viewed;

generate a usefulness score based on the explicit feedback and the implicit feedback; and train the machine learning system based on the usefulness score to improve the machine learning function.

9. The system according to claim 8, wherein the processor:

inputs a treatment plan into a natural language processor, wherein the one or more keywords depend on the patient information, clinician information, and the treatment plan.

10. The system according to claim 8, wherein the machine learning function selects a portion of an educational clinical content item from the plurality of educational clinical content items based on the one or more keywords.

11. The system according to claim 8, wherein the patient information includes clinical patient information and nonclinical patient information.

12. The system according to claim 8, wherein the one or more keywords comprises a nonclinical keyword and a clinical keyword.

13. The system according to claim 8, wherein the patient information comprises one or more items selected from the group consisting of patient age, patient sex, data files about the patient, patient requirements, clinician assessments of the patient, clinician preferences, extra-oral photographs, intra-oral photographs, 3D image files, radiographic images, patient motivations, patient concerns, treatment discussions, treatment timing, intervention preferences, patient name, patient sex, patient age, patient date of birth, prior dental treatment, prior dental treatment, prior orthodontics treatment details, prior facial aesthetics, prior facial aesthetics, patient fitness, patient dental fitness, patient occupation, patient dietary factors, patient drug history, patient smoking history, patient alcohol history, and patient teeth grinding history.

14. The system according to claim 8, wherein the patient information comprises one or more items selected from the group consisting of upper dental center-line in relation to the midline of the face, lower dental center-line in relation to the upper dental center-line, lower dental center-line in relation to the midpoint of the chin, amount of crowding in the upper arch, an amount of crowding in the lower arch, the amount of overjet, incisor relationship, amount of overbite, amount of open bite, molar relationship, the teeth in a crossbite, caries risk, perio risk, tooth surface loss, oral health pathology, dental pathology, facial pathology, oral hygiene, BPE, and gingival biotype.

* * * * *